United States Patent
Wang et al.

(10) Patent No.: US 11,055,285 B2
(45) Date of Patent: Jul. 6, 2021

(54) ACCESS PATH OPTIMIZATION

(71) Applicant: INTERNATIONAL BUSINESS MACHINES CORPORATION, Armonk, NY (US)

(72) Inventors: Xiaobo Wang, Beijing (CN); Shuo Li, Beijing (CN); Xin Peng Liu, Beijing (CN); ShengYan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 15/699,129

(22) Filed: Sep. 8, 2017

(65) Prior Publication Data
US 2019/0079973 A1 Mar. 14, 2019

(51) Int. Cl.
*G06F 16/2453* (2019.01)

(52) U.S. Cl.
CPC .. *G06F 16/24542* (2019.01); *G06F 16/24535* (2019.01)

(58) Field of Classification Search
None
See application file for complete search history.

(56) References Cited

U.S. PATENT DOCUMENTS

| | | | |
|---|---|---|---|
| 7,526,508 B2 | 4/2009 | Tan et al. | |
| 7,747,606 B2 | 6/2010 | Dageville et al. | |
| 9,063,973 B2 | 6/2015 | Bossman et al. | |
| 9,652,497 B2 | 5/2017 | Beavin et al. | |
| 2011/0314000 A1* | 12/2011 | Chaudhuri | G06F 16/24542 707/718 |
| 2017/0068704 A1 | 3/2017 | Feng et al. | |

OTHER PUBLICATIONS

Graefe et al., The Volcano Optimizer Generator: Extensibility and Efficient Search 1993, IEEE, pp. 209-218.*
CMU Database Group, L14—Optimizer Implementation (Part I) [CMU Database Systems Spring 2017] Mar. 2, 2017, youtube.com, https://www.youtube.com/watch?v=1VX1evaBv20.*
CMU Database Group, Lecture #14—Optimizer Implementation (Part 1), cmu.edu, https://15721.courses.cs.cmu.edu/spring2017/slides/14-optimizer1.pdf.*
Graefe, The Cascades Framework for Query Optimization 1995, Data Engineering Bulletin, https://www.cse.iitb.ac.in/infolab/Data/Courses/CS632/Papers/Cascades-graefe.pdf.*
IBM Knowledge Center, "Collecting Data for Access Path Performance Problems", http://www.ibm.com/support/knowledgecenter/en/SSEPEK_10.0.0/trbshoot/src/tpc/db2z_cd4accesspath.html, Jun. 19, 2017, pp. 1-2.
Kester et al., Access Path Selection in Main-Memory Optimized Data Systems: Should I Scan or Should I Probe?, SIGMOD '17, May 14-19, 2017, Chicago, IL, USA, 2017 ACM, pp. 1-16.
Oracle Help Center, Database SQL Tuning Guide, 21 Optimizing Access Pathys with SQL Access Advisor, 12c Release 1 (12.1), Jul. 2017, pp. 571-607.
Mell et al., "The NIST Definition of Cloud Computing", National Institute of Standards and Technology, Special Publication 800-145, Sep. 2011, pp. 1-7.

* cited by examiner

Primary Examiner — Jason G Liao
(74) Attorney, Agent, or Firm — John Noh

(57) ABSTRACT

A first query is received by a computing device to access data in a database. A first access path is identified based on optimization information about a second query. The first access path is applied.

17 Claims, 6 Drawing Sheets

ACCESS PATH OPTIMIZATION

BACKGROUND

The present disclosure relates to data processing, and more specifically, to optimization in database systems.

BRIEF SUMMARY

Embodiments of the present invention disclose a method, computer program product, and computer system for access path optimization. This summary is provided to introduce a selection of concepts in a simplified form that are further described below in the detailed description. This summary is not intended to identify key features or essential features of the claimed subject matter, nor is it intended to be used to limit the scope of the claimed subject matter.

According to an embodiment of the present disclosure, there is provided a computer-implemented method. A first query to access data in a database may be received. A first access path for the first query may be identified based on optimization information about a second query. The first access path may be applied.

According to another embodiment of the present disclosure, there is provided a computer system. The computer system may comprise one or more processors, a memory coupled to at least one of the processors, and a set of computer program instructions stored in the memory and executed by at least one of the processors in order to perform actions of, receiving a first query to access data in a database, identifying a first access path for the first query based on optimization information about a second query, and applying the first access path.

According to still another embodiment of the present disclosure, there is provided a computer program product, comprising a computer readable storage medium having program instructions embodied therewith. The program instructions is executable by a processor to cause the processor to: receive a first query to access data in a database, identify a first access path for the first query based on optimization information about a second query, and apply the first access path.

In addition to the exemplary aspects and embodiments described above, further aspects and embodiments will become apparent by reference to the drawings and by study of the following descriptions.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
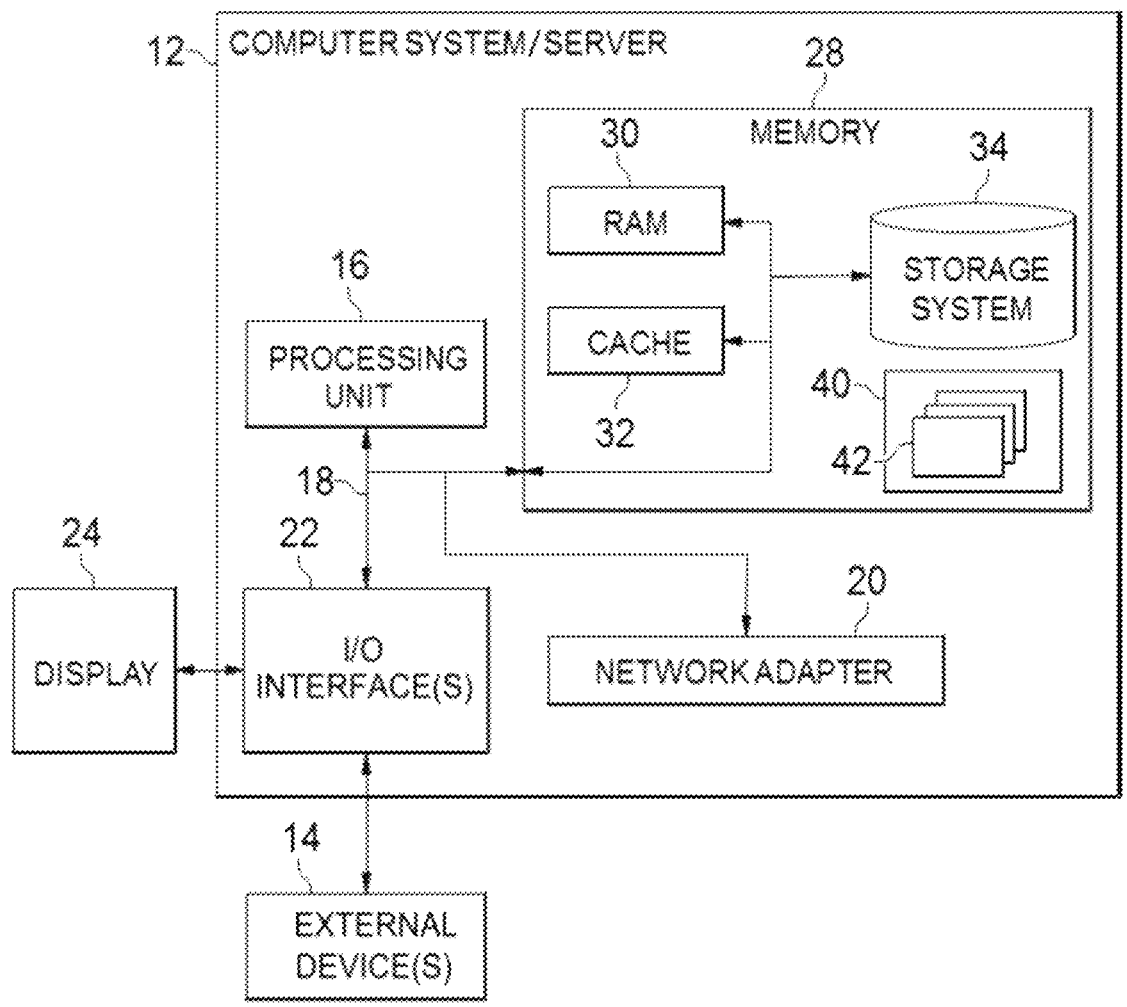
FIG. 1 depicts a cloud computing node in accordance with an embodiment of the present disclosure.

During the process of accessing a database, in order to conduct a query, it is usually needed to have an access plan. The access plan, also referred as access path, defines in what order tables are accessed, which indexes are used, and what joining method is used to link data. A good access plan is very important for the performance of a structured query language (SQL) statement. Efforts have been spent on access path tunings to get optimal performance, but this usually done by experts.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
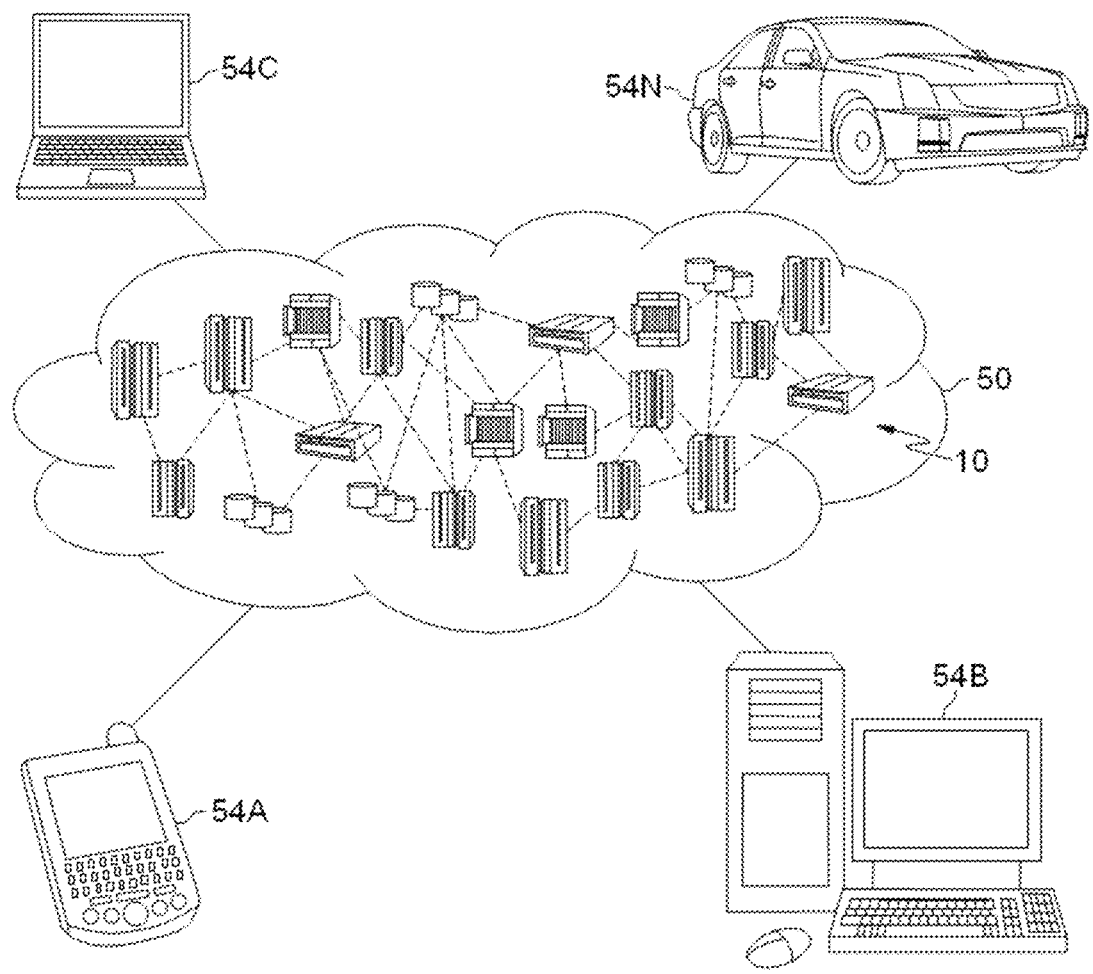
FIG. 2 depicts a cloud computing environment in accordance with an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
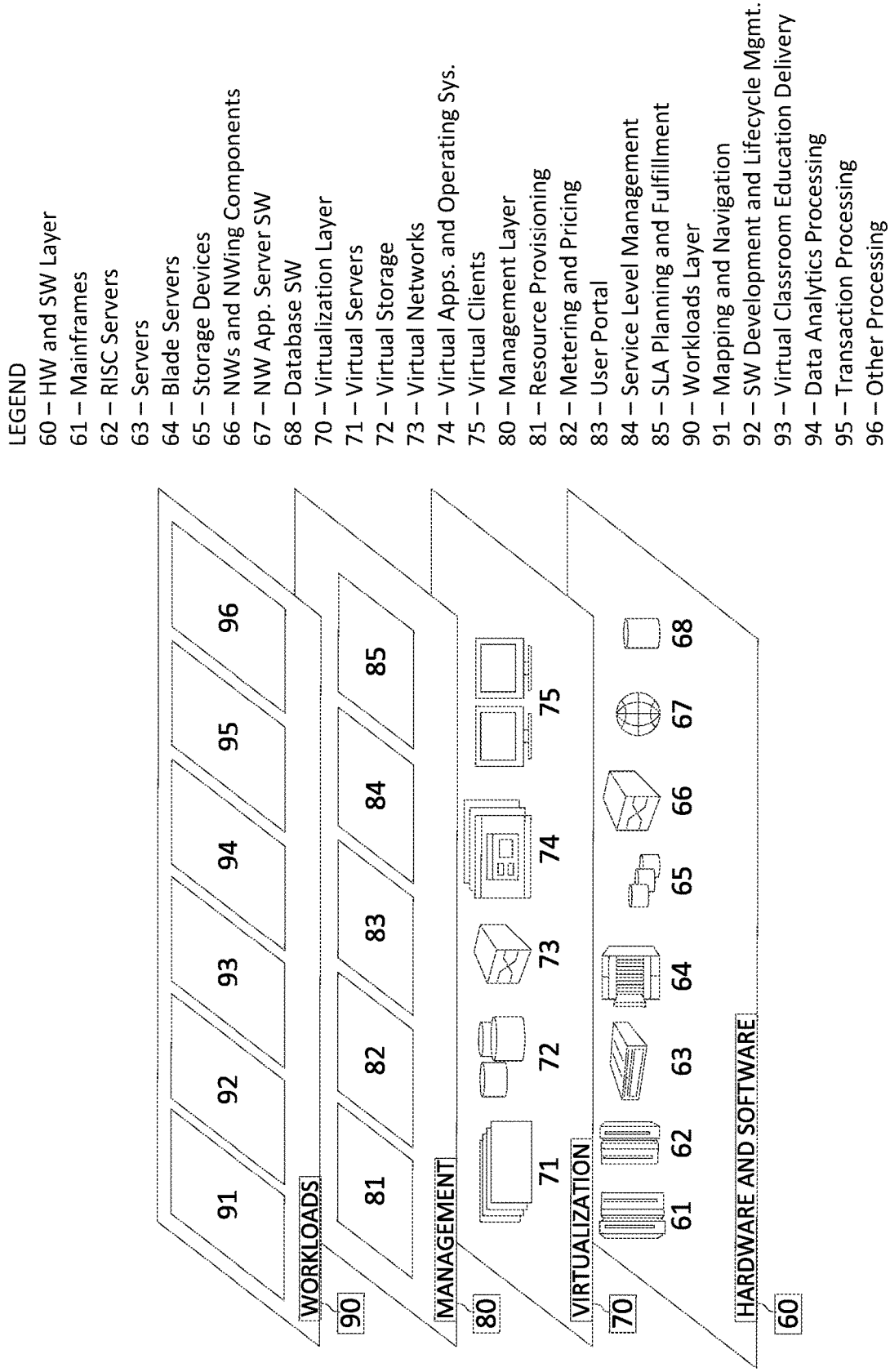
FIG. 3 depicts abstraction model layers in accordance with an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and other processing 96.

Figure 4:
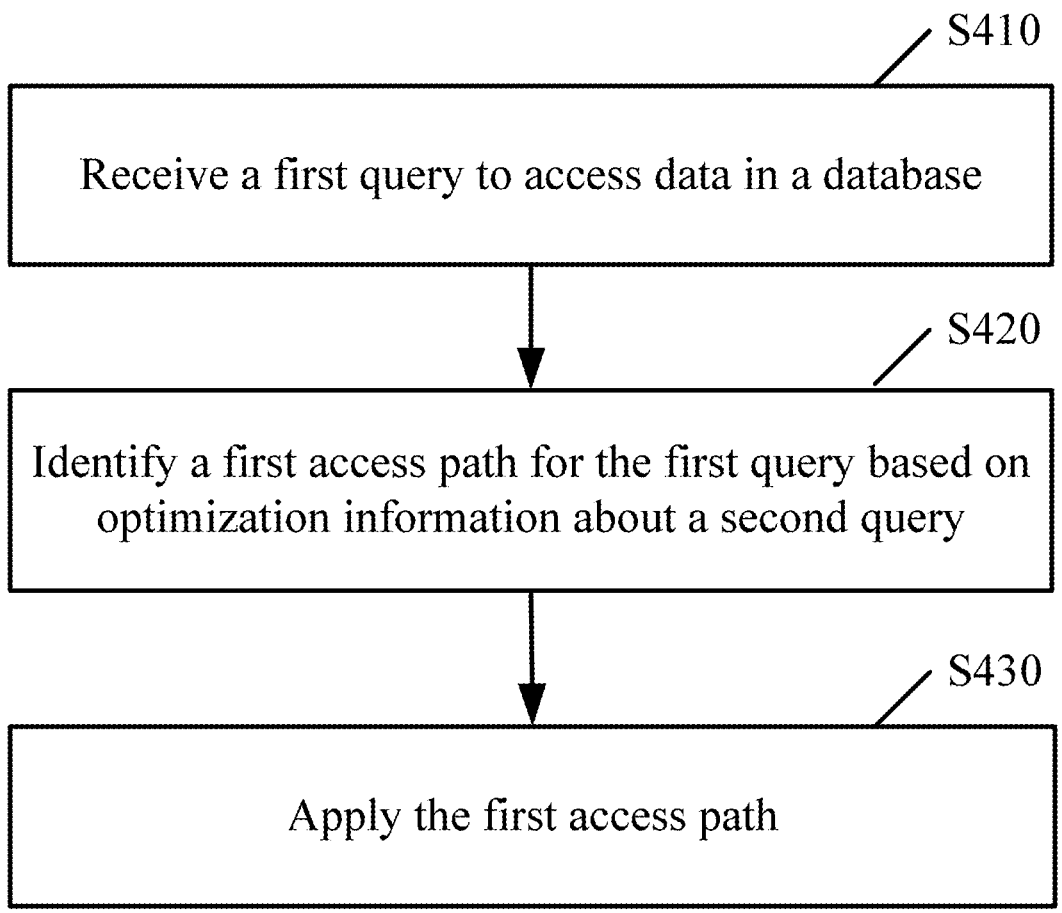
FIG. 4 is a schematic flowchart showing the method for optimizing access path in accordance with an embodiment of the present disclosure.

FIG. 4 is a schematic flowchart depicting the method for optimizing access path according to an embodiment of the present disclosure. Conventionally, the query optimizer of a database system optimizes access path for a database query according to statistical information. For example, the optimizer may estimate the costs of each candidate access path according to the statistics information in the database, and select the access path with the minimum cost as the optimal path. The above mentioned costs may comprise Central Processing Unit (CPU) execution cost, Input/Output (IO) cost, and so on. However, the performance of a database system depends on various aspects and factors in addition to the cost-based estimate. A database expert usually needs to consider all relevant factors when tuning or optimizing the database.

On the other hand, as more and more applications are moved to online environment, such as, intranet, internet, or cloud environment, the information about database optimization also becomes available online. For example, after an expert tunes a database for one or more queries/workloads, information about the queries, their access paths and performance (improvement) is saved locally in the database or saved in the online system. This information can be a valuable resource for another workload's optimization. That is, this information can be accessed by other users, devices or database systems for performance optimization.

Some embodiments of the present disclosure can take advantage of the online information and provide an efficient method for access path optimization. As shown in FIG. 4, the process starts at step S410, where a first query to access data in a database is received. Database query, for example using SQL, relates to a series of statements, commands or conditions for accessing data stored in the database. For example, a query statement may be assigned to a specific position in a database, such as a table, a row or a column, to access data. During compiling process before performing the query statement, most database management systems (DBMS) usually parse the statement to one or more relational operators, which indicates how to perform the query statement. The relational operator can be sorted according to the query plan or access plan.

As an example, the following statement illustrates that a table TAB is created with three index IDX_1, IDX_2 and IDX_3. A query is received to access data contained in this table:

```
Sample Statement 1:
    CREATE TABLE TAB (C1 INT, C2 VARCHAR(10), C3
    CHAR(10))
    CREATE INDEX IDX_1 ON TAB (C1, C2)
    CREATE INDEX IDX_2 ON TAB (C1)
    CREATE INDEX IDX_3 ON TAB (C2)
    ...
    <query 1>
    SELECT C3
    FROM TAB
    WHERE C1>10 AND C2 LIKE'ABC%'
```

Then, the process proceeds to step S420. A first access path is identified for the first query based on optimization information about a second query. As discussed above, as more and more applications are moved to online environment, the information about database optimization becomes available online. After an expert tunes a database for one or more queries/workloads, information about the queries, their access paths and performance (improvement) is saved in the online system or saved locally in the database (in a device associated with the database). This information can be a value resource for another database's optimization. Therefore, the optimization information about the second query can be obtained online, or from the expert or other devices associated with the database. Depending on the systems, this optimization information may be stored in system tables or repositories. Taking DB2 as an example, the optimization information is usually stored in system tables, such as EXPLAIN tables or PLAN_TABLE. Various query optimization and administration tools, such as IBM® Data Studio and InfoSphere® Optim™ Query Workload Tuner, may help obtain the stored optimization information.

According to an embodiment, after the expert has tuned the access path for one workload, this information may be used for another similar workload. In other words, the second query is similar to the first query. Specifically, the system may check the optimization information to find a second query that is similar to the received first query. For example, the first and second queries may access the same table and have similar predicates. Alternatively, the first and second queries may access different tables that have similar table cardinalities.

Since the second query has been tuned by the expert, its access path can be identified as a machine-learned access path (for example, an online-learned access path) for the first query. Thus, the optimization information can be used for other workloads' optimization. This is especially helpful for applications that have many similar or repeated workloads, such as SAP applications.

In another embodiment, the system may employ the existing optimization information to obtain one or more optimization rules. By applying the rules, the system may identify the first access path from a plurality of candidate access paths.

Specifically, each of the optimization rules comprises one or more features of the plurality of access paths. For example, the features may include, but are not limited to, matching cost, matching column coverage, filter factor, matching column and screening, as follows:

matching column, shows that a column in a predicate is matched with a column of the index under the access path;

matching cost, shows the estimate costs for accessing a matching predicate;

matching column coverage, shows how many predicate columns have been matched by the index under the access path;

filter factor (FF), shows the ratio of data entries selected form a specified range of a database to the total data entries of the specified range;

screening, shows that the predicates are not fully matched with the columns of an index, but still refer to index columns.

It is noted that the optimization features are not limited to the above examples. Other features may be employed, as long as they are helpful for access path machine learning of optimization rules.

Then, the system may obtain one or more optimization rules based on the optimization information. Each rule may comprise one or a combination of features. Hereinafter shows exemplary rules a) to f):

a) Based on the feature of matching column coverage, rule a) indicates superset BMC (Best Matching Column) coverage. The columns in the matching predicates are matching columns. Rule a) refers to the situation where one-index-matching columns are a superset of predicate columns.

b) Based on the feature of filter factor (FF), rule b) indicates better estimated matching filter factor. A filter factor is, when "filtering" with a specified condition in a query statement, the ratio of data entries selected form a specified range of a database to the total data entries of the specified range. Generally, the index with lower FF has better performance.

c) Based on the features of matching cost and filter factor, rule c) indicates better matching cost and worse filter factor. Rule c) refers to the situation where the estimated cost for a matching column is better but FF is worse.

d) Based on the feature of matching column, rule d) indicates better matching column group cardinality. Column group cardinality means the number of different values for combination of columns in the column group. Usually, if the column group cardinality is bigger, the combination filter is better.

e) Based on the features of matching column, screening and filter factor, rule e) indicates better estimated matching+screening filter factor. Screening predicate is the predicate that have not been picked as index matching predicates but still refer to index columns. For example, the used index may have column 1 to 4, and only column 1, 2 and 4 are referred to by the predicates. Rule e) refers to the situation where the matching plus screening has better filter factor.

f) Based on the features of matching column and screening, rule f) indicates better matching and screening column group cardinality. Similar with the above rules, rule f) refers to the situation where the matching+screening has bigger column group cardinality.

It should be noted that the optimization rules are not limited to the above examples. Other rules can also be obtained through access path machine learning based on the optimization information.

For the first query, the system may generate a plurality of candidate access paths. This can be done by using any existing or future technologies. For example, access plans may be enumerated based on access methods (such as tablespace scan, index scan, prefetch), join sequences (such as, left-deep join sequences only) and join methods (such as, nested-loop join, sort-merge join, hybrid join). Then, the system may select some of the access plans with lower estimated costs as the candidate access paths. By applying the optimization rules, the system may identify the first access path from the candidate access paths.

Taking the above sample statement 1 as an example, suppose that some experts may have tuned the query 1 on multiple occasions. As a result, the optimization information available may comprise information about the query, its tuned access paths (e.g. access path A and access path B) and their performance. Under access path A, an access method with respect to multiple column index (IDX_1) is chosen. IDX_1 has two matching column C1 and C2. Under access path B, an access method with respect to two single indexes (IDX_2 and IDX_3) is chosen. IDX_2 has one matching column C1, and IDX_3 has one screening column C2.

As discussed above, since IDX_1 is the superset of IDX_2, the rule a) may be obtained from the optimization information under access path A. Since IDX_1 has more matching predicates, the rule c) may be obtained from the optimization information under access path A. Similarly, the rules a), c) and f) may be obtained from the optimization information under access path A, and the rules b), d), and e) may be obtained from the optimization information under access path B.

Suppose that for a received query, the system generates two candidate access paths X and Y. Access path X satisfies the rules b), d) and e); while access path Y satisfies the rule b). Then, access path X can be identified as the first access path for the received query.

Alternatively, the optimization rules can be assigned with different priorities. Specifically, the optimization rules for the access path with better performance are assigned with higher priority. As for the above example, the only optimization information may have multiple access paths for a query/workload. These access paths may have different performance. The system may assign a higher priority to the rules that met by an access path having better performance. Taking the above example, suppose that the access path B has better performance than the access path A. Then, the rules b), d) and e) that access path B meets can be assigned with higher priority than the rules a), c) and f) that access path A meets. When evaluating the candidate access path for a received query, the system may give more weight to an optimization rule having higher priority. Still take the above example, access path X may still be identified as it satisfies the rules b), d) and e), which have higher priorities.

Then the process proceeds to step S430, where the first access path may be applied.

After identifying the first access path at step S420, in an embodiment, the first access path may be tested. Though the first access path is identified through access path machine learning, it still possible that it is not suitable for the specific received query or workload. The system may further determine the best access path by testing its performance.

In an embodiment, based on the test result of the first access path, the system may decide whether to apply the first access path. For example, the system may apply the first access path if its tested performance is better than a predetermined threshold. Otherwise, the system may further identify and test another access path.

Alternatively, the first query may be assigned with a current access path (second access path) already, for example, through a previous round of optimization. According to an embodiment, the system may first compare the estimated cost of the first access path with the current access path (second access path). If the estimated cost of the first access path is better or close to the second access path, the system may test both of the first and second access paths, to obtain their real performances, like real execution time. If the estimated cost of the first access path is substantially higher than the estimated cost of the second access path, for example, by at least a predetermined threshold, then the first access path would be discarded directly and the second access path is applied to the first query.

If the test results show that the performance of the first access path is better than the second access path, then the first access path would be applied to the first query. Moreover, the second access path can be saved as previous access path.

Figure 5:
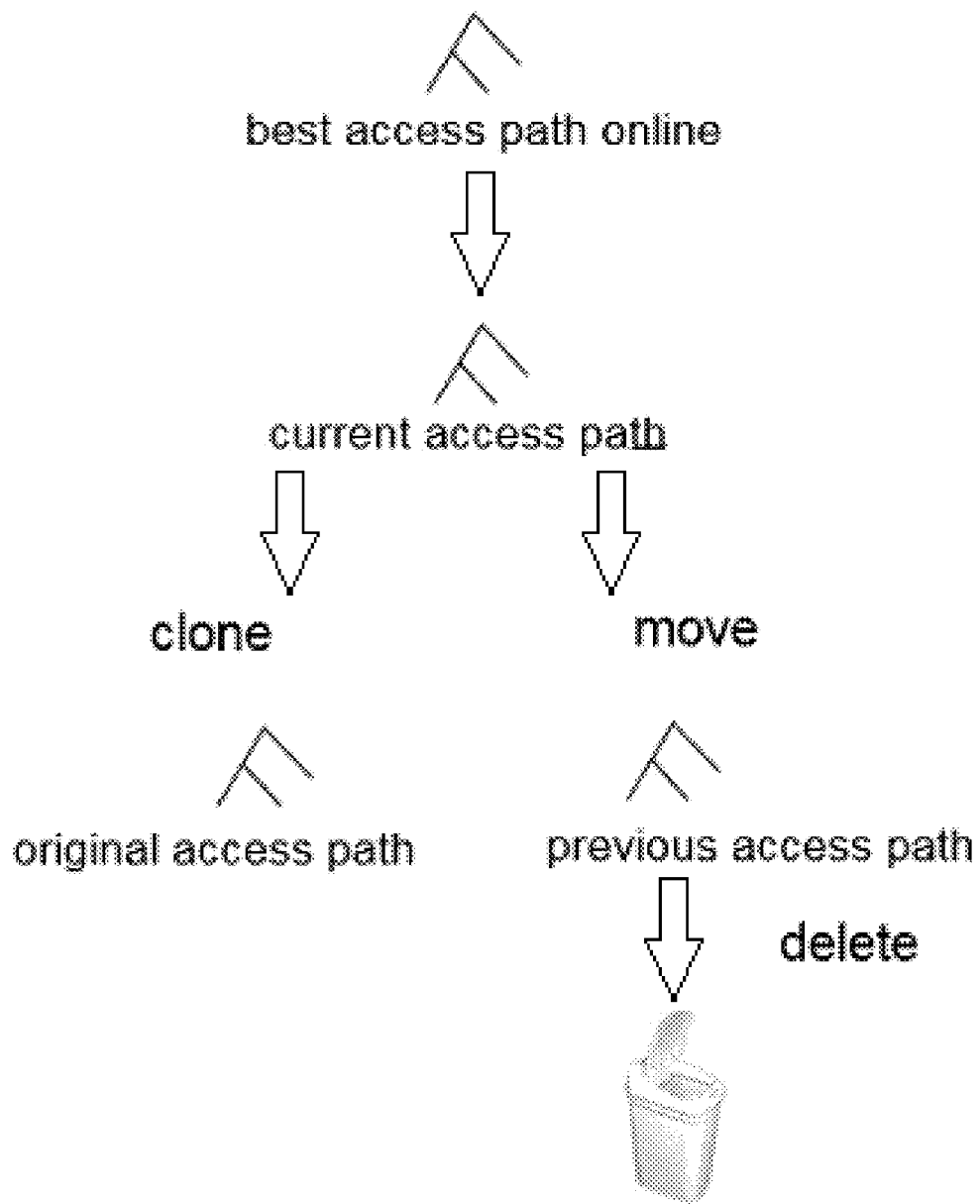
FIG. 5 is a schematic diagram illustrating an example for applying the access path in accordance with an embodiment of the present disclosure.

FIG. 5 is a diagram showing that the system may apply the better access path and make safe change for the access path. Specifically, the system firstly copies the original access path (for example, the cost-based access path), and save it as an existing access path. If the performance of the new access path (i.e. the rule-based access path) is worse than the original (or, existing) one, the system could restore the original (or, existing) access path. Otherwise, if the performance of the new access path is better, the new access path is identified as the existing access path, and the previous existing access path should be discarded. In this way, it is easy for the database system to maintain by itself, and to prevent regression.

Take sample statement 2 as an example, as follows:

```
Sample Statement 2:
    SELECT *
    FROM T1
    WHERE C1=100 AND C2=200
```

Suppose that there are two indexes for the table T1, which are IX1(C1) and IX2(C2). Currently, the original access path uses index IX1. Through access path machine learning as described above, the system may identify a first access path, which uses IX2. If the cost of the first access path is better or close to the current access path, then the system may run the query with the first access path. If the performance is worse than the current access path, then the first access path will be discarded. Otherwise, the first access path can be assigned to the query and the old access path can be saved as original access path.

In some scenarios, a query may be divided into a plurality of sub-queries. Examples may include "union all" statements, "view" statements, "subquery" statements and so on. Below is an example of "union all" statement:

```
Sample Statement 3:
    SELECT C1
    FROM T1
    WHERE C2=? AND (C3=? OR C4=?)
    UNION ALL
    SELECT C1
    FROM T1
    WHERE C2 BETWEEN ? AND ? AND C3=? AND (C4=? OR
    C5=?)
```

In sample statement 3, the query can be divided into two sub-queries, as following shows:

```
Sub-query 1:
    SELECT C1
    FROM T1
    WHERE C2=? AND (C3=? OR C4=?)
Sub-query 2:
    SELECT C1
    FROM T1
    WHERE C2 BETWEEN ? AND ? AND C3=? AND (C4=? OR
    C5=?)
```

Since a sub-query is simpler than the original query, it is easier to be optimized through access path machine learning.

Figure 6:
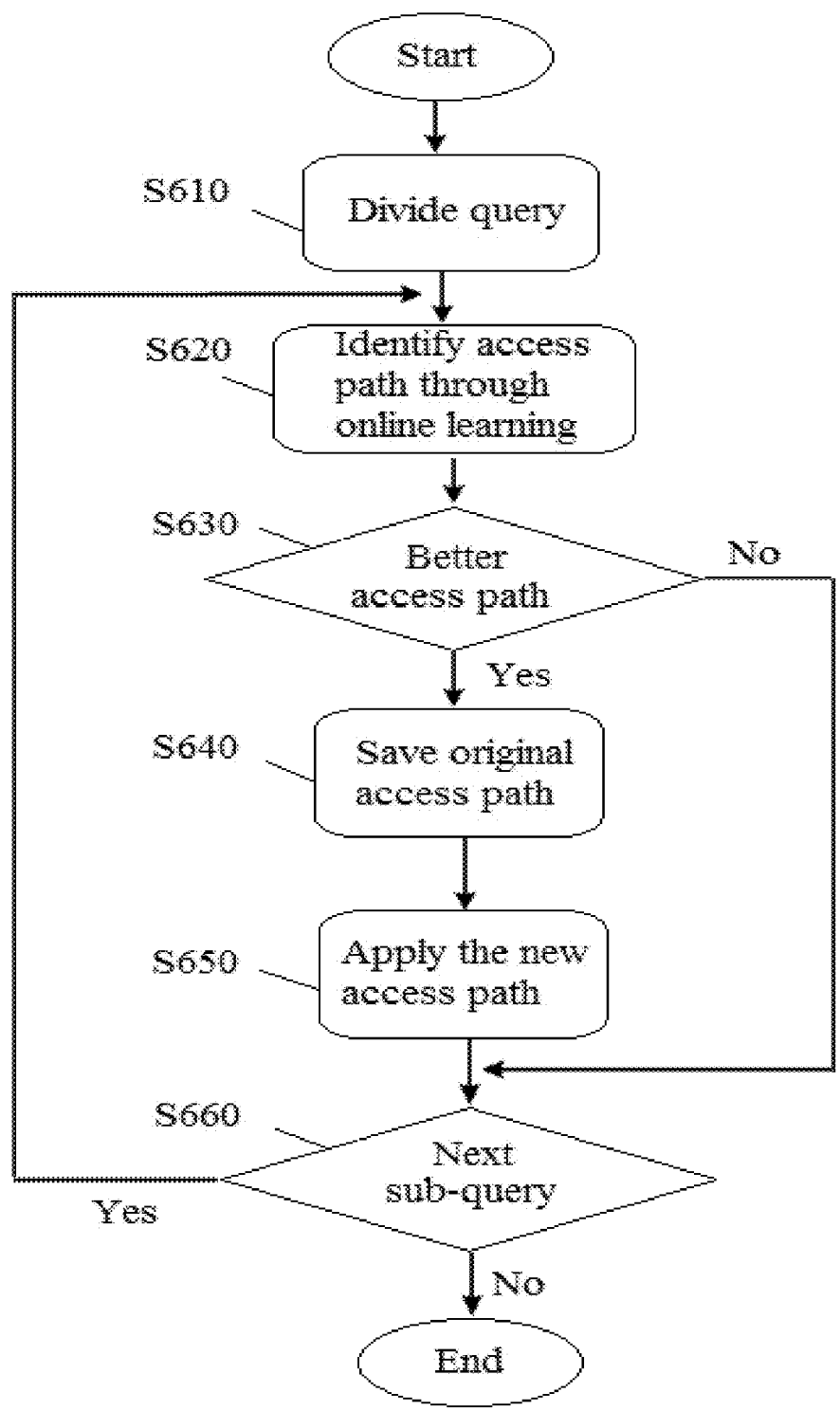
FIG. 6 is schematic diagram illustrating an example of the access path optimization in which the method shown in FIG. 4 is implemented.

FIG. 6 shows an exemplary process for access path optimization, to which the method according to an embodiment is performed. As shown in FIG. 6, the method starts from step S610, where a first query for accessing data of a database is received and then is divided into several sub-queries. As will be described below, the system may optimize each of the sub-queries based on online learning.

For each sub-query, the system identifies a first access path through online learning at step S620, as described above. Then the first access path is tested at step S630. When the system determines the tested performance of the first access path is better than the performance of the original access path, the process proceeds to step S640, where the original access path is saved. Then the process proceeds to step S650, wherein the first access path is applied to the sub-query. The system may check whether there is a next sub-query to optimize. After every sub-query has been optimized, the process ends.

At step S630, if it is determined that the tested performance of the first access path is worse than the performance of the original access path, then the process proceeds to step S660 without changing the original access path.

In this way, the system may repeat the steps S620 to S650 for each sub-query through online learning. Therefore, the system improves the access path for the received query iteratively. Moreover, the improved changes could be shared online, and the other database system could also take advantages from the results.

Under the same inventive concept, another embodiment of the disclosure can provide a computer system for string comparison. The computer system can comprise a processor, a computer-readable memory coupled to the processor. The memory comprises instructions that when executed by the processor perform actions of, receiving a first query to access data in a database, identifying a first access path for the first query based on optimization information about a second query, and applying the first access path.

Specifically, the computer system of the embodiment can be implemented with computer system/server 12 shown in FIG. 1. The processors can be implemented as Processing Unit 16 and the memory can be implemented as Memory 28.

Under the same inventive concept, another embodiment of the disclosure can provide a computer program product for string comparison. The computer program product comprises a computer readable storage medium having program instructions embodied therewith. The program instructions executable by a processor cause the processor to, receive a first query to access data in a database, identify a first access path for the first query based on optimization information about a second query available, and apply the first access path.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for access path optimization in processing queries, the method comprising:
   receiving, by a computing device, a first query to access data in a database;
   identifying a first access path for the first query based on optimization information about a second query, the second query comprising a plurality of queries, the optimization information comprising information about a plurality of access paths for the second query and performance of the plurality of access paths, the identifying the first access path for the first query comprising obtaining a plurality of rules based on the optimization information, wherein the rules comprise one or more features of the plurality of access paths associated with a predicate column matching a further feature of a corresponding index, the rules having a respective priority assigned thereto based on a performance of a corresponding one of the access paths, wherein the first access path is a selected one of the access paths for the second query, each of the access paths for the second query being associated with respective ones of the rules, the selected access path for the second query having a highest total priority of the respective rules associated therewith;
   testing the first access path; and
   as a result of the first access path having a tested performance passing a predetermined threshold, the tested performance being indicative of a cost in utilizing the first access path, applying the first access path.

2. The method in accordance with claim 1, wherein the optimization information comprises information about a selected access path for the second query and performance of the selected access path.

3. The method in accordance with claim 2, wherein the second query is similar to the first query based on matching first predicate information associated with the first query and second predicate information associated with the second query, and the selected access path is identified as the first access path.

4. The method in accordance with claim 1, further comprising:
   dividing the first query into a plurality of sub-queries; and
   performing the steps of identifying, testing and applying with respect to each of the sub-queries.

5. The method in accordance with claim 1, wherein the step of identifying the first access path for the first query further comprises:
   identifying the first access path based on the rules.

6. The method in accordance with claim 5, wherein the features comprise one or more of the following: matching costs, filter factors, matching columns, matching column coverage and screening.

7. The method in accordance with claim 1, wherein the first query is assigned with a second access path, applying the first access path comprises:
   testing the first access and the second access path; and applying the first access path to the first query if performance of the first access path is better than performance of the second access path.

8. The method in accordance with claim 7, further comprising:
saving the second access path if the first access path is applied to the first query.

9. A computer system for access path optimization in processing queries, the computer system comprising:
a processor;
a computer-readable memory coupled to the processor, the memory comprising instructions that when executed by the processor perform actions of:
receiving by the processor a first query to access data in a database;
identifying a first access path for the first query based on optimization information about a second query, the second query comprising a plurality of queries, the optimization information comprising information about a plurality of access paths for the second query and performance of the plurality of access paths, the identifying the first access path for the first query comprising obtaining a plurality of rules based on the optimization information, wherein the rules comprise one or more features of the plurality of access paths associated with a predicate column matching a further feature of a corresponding index, the rules having a respective priority assigned thereto based on a performance of a corresponding one of the access paths, wherein the first access path is a selected one of the access paths for the second query, each of the access paths for the second query being associated with respective ones of the rules, the selected access path for the second query having a highest total priority of the respective rules associated therewith;
testing the first access path; and
as a result of the first access path having a tested performance passing a predetermined threshold, the tested performance being indicative of a cost in utilizing the first access path, applying the first access path.

10. The computer system in accordance with claim 9, wherein the optimization information comprises information about a selected access path for the second query and performance of the selected access path.

11. The computer system in accordance with claim 10, wherein the second query is similar to the first query based on matching first predicate information associated with the first query and second predicate information associated with the second query, and the selected access path is identified as the first access path.

12. The computer system in accordance with claim 9, wherein the set of computer program instructions when executed further performs actions of:
dividing the first query into a plurality of sub-queries; and
performing the steps of identifying, testing and applying with respect to each of the sub-queries.

13. The computer system in accordance with claim 9, wherein identifying the first access path for the first query further comprises:
identifying the first access path based on the rule.

14. The computer system in accordance with claim 13, wherein the features comprise one or more of the following: matching costs, filter factors, matching columns, matching column coverage, and screening.

15. The computer system in accordance with claim 9, wherein the first query is assigned with a second access path, applying the first access path comprises:
testing the second access path; and
applying the first access path to the first query if performance of the first access path is better than performance of the second access path.

16. The computer system in accordance with claim 15 wherein the set of computer program instructions when executed further performs actions of:
saving the second access path if the first access path is applied to the first query.

17. A computer program product for access path optimization in processing queries, comprising a computer readable storage medium having program instructions embodied therewith, the program instructions executable by a processor to cause the processor to:
receive by the processor a first query to access data in a database;
identify a first access path for the first query based on optimization information about a second query, the second query comprising a plurality of queries, the optimization information comprising information about a plurality of access paths for the second query and performance of the plurality of access paths, the identifying the first access path for the first query comprising obtaining a plurality of rules based on the optimization information, wherein the rules comprise one or more features of the plurality of access paths associated with a predicate column matching a further feature of a corresponding index, the rules having a respective priority assigned thereto based on a performance of a corresponding one of the access paths, wherein the first access path is a selected one of the access paths for the second query, each of the access paths for the second query being associated with respective ones of the rules, the selected access path for the second query having a highest total priority of the respective rules associated therewith;
test the first access path; and
as a result of the first access path having a tested performance passing a predetermined threshold, the tested performance being indicative of a cost in utilizing the first access path, apply the first access path.

* * * * *